June 29, 1965    A. A. DUFF    3,191,813
LABORATORY APPARATUS
Filed April 23, 1962    7 Sheets-Sheet 3

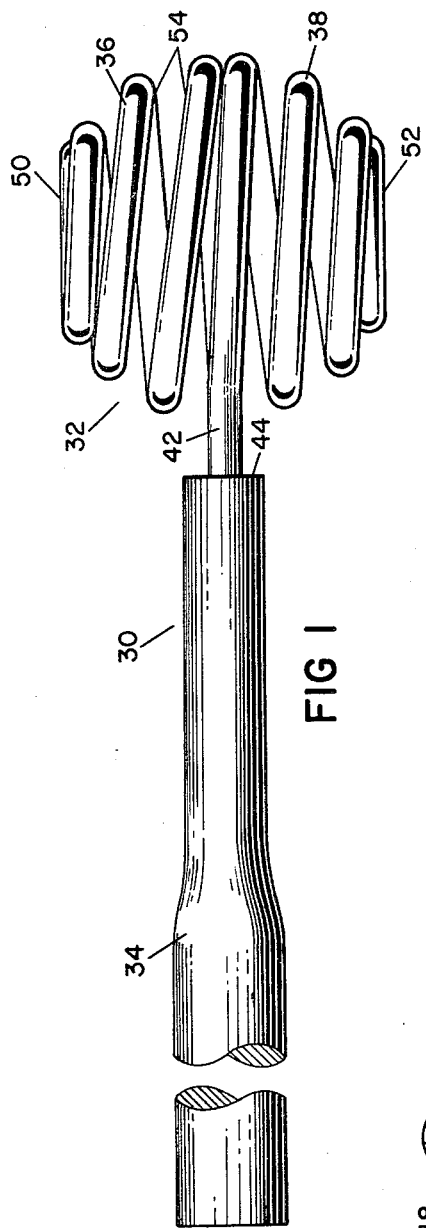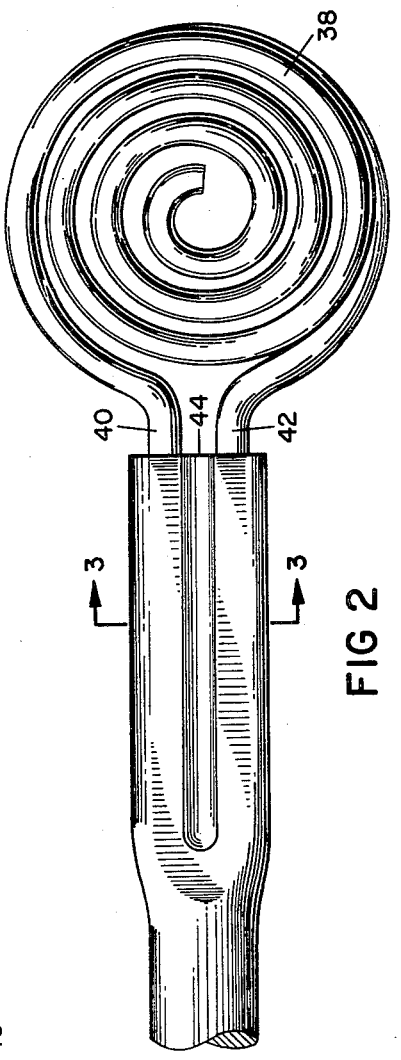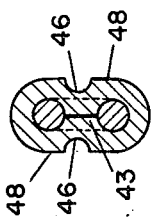

Inventor
Alan A. Duff

Attorneys

June 29, 1965 A. A. DUFF 3,191,813
LABORATORY APPARATUS

Filed April 23, 1962 7 Sheets-Sheet 4

Inventor
Alan A. Duff

Attorneys

June 29, 1965    A. A. DUFF    3,191,813
LABORATORY APPARATUS
Filed April 23, 1962    7 Sheets-Sheet 5

Inventor
Alan A. Duff
Attorneys

Inventor
Alan A. Duff
Attorneys

United States Patent Office 3,191,813
Patented June 29, 1965

3,191,813
LABORATORY APPARATUS
Alan A. Duff, North Springfield, Va., assignor to Cooke Engineering Company, Alexandria, Va., a corporation of Delaware
Filed Apr. 23, 1962, Ser. No. 189,491
21 Claims. (Cl. 222—356)

This invention relates to laboratory apparatus and, more specifically, to dilution loops which may advantageously be used with microtitration apparatus of the type disclosed in copending application No. 135,364, filed August 31, 1961, by Alan A. Duff et al.

The microtitration apparatus disclosed in the copending application referred to above is especially useful for conducting viral serological investigations and includes a series of Plexiglas plates, each having several rows of recesses which, in the course of a serological investigation, are filled with a minute volume (usually either 0.025 or 0.050 milliliter) of an appropriate diluent.

A number of dilution loops equal to the number of recess rows, each having a liquid-carrying head which usually has a capacity of either 0.025 or 0.050 milliliter, are then filled with a liquid reagent. The filled dilution loops are removed to the Plexiglas plates and inserted into the first diluent filled recess in each row. After rotating the loops to mix the reagent and the diluent, the loops are removed to the adjacent recess in each row and rotated to mix the diluted reagent carried by the loops with the diluent in those recesses. The process is repeated down the rows, progressively decreasing the concentration of the reagent in the recesses. The concentrations thus prepared are then treated or analyzed in accordance with the procedure established for the particular serological investigation being conducted.

Since the volumes of diluent and liquid reagent employed in the above-described microtitration apparatus are extremely small, it is of the utmost importance that these volumes be accurately measured since, if they are not, dependable results will not be obtained. The dilution loops described in the application referred to above consist of a liquid-carrying head formed from a pair of wires spirally wound to form a hollow sphere and an apertured, elongated handle in which the ends of the head forming wires are fixed. The actual capacity of this type of loop commonly varies as much as ±5% from the desired capacity. While this degree of deviation is acceptable in most instances, it is disadvantageous in that it requires a large number of samples to be employed for each investigation so that the results can be error averaged to eliminate the effects of the variations in dilution loop capacity.

It is, therefore, an object of the present invention to provide improved dilution loops having a significantly smaller variance in capacity than the prior art dilution loops described above.

Other disadvantages of the prior art dilution loops described above also resulted from the spherical configuration of the liquid-carrying heads. First, this configuration provided a comparatively inefficient agitating or mixing action when the loop was rotated within the recesses in the plates of the microtitration apparatus. Moreover, this configuration required that the technician performing the investigaion exercise extreme care in order to avoid scratching the interior surfaces of the plate recesses when the loops were rotated.

Accordingly, it is a further object of the present invention to provide improved dilution loops having liquid-carrying heads with non-spherical configurations which provide improved agitating action and which eliminate the possibility that the interior surfaces of the plate recesses being scratched when the loops are rotated in these recesses.

As was pointed out above, the dilution loops heretofore known employed liquid-carrying heads formed from spirally wound wires having their ends inserted in an aperture in and opening onto the end of an elongated handle. In this construction, significant quantities of the liquid material carried by the loop were retained between the adjacent wire ends in the open aperture, adversely affecting the accuracy of the loops.

It is a further object of this invention, therefore, to provide improved dilution loops including liquid-carrying heads formed from spirally wound wires having shanks inserted in an apertured elongated handle and constructed by a novel process which prevents the liquid reagent carried by the loop from being retained in the shank receiving aperture.

Dilution loops of the type to which the present invention pertains have heretofore been fabricated from stainless steel wire to inhibit the deteriorating effects of the corrosive liquid materials commonly employed in serological investigation.

It is another object of the present invention to provide improved dilution loops which may be fabricated from materials that are less expensive and more easily fabricated than the stainless steel heretofore employed.

It is to be understood that the novel, improved dilution loops provided by the present invention are by no means limited to the application described above. On the contrary, these loops may be employed to advantage whenever small quantities of liquids are to be accurately measured or when low concentration dilutions of liquid materials are to be prepared. For example, by employing these improved loops, very small quantities of blood may be taken from the finger-tip or from a laboratory animal and used to prepare dilutions suitable for quantitative tests. As a further example, these loops permit the taking of several plasma samples from a small quantity of sedimented blood without stirring up the plasma. Furthermore, these loops may be used in paper chromatography and electrophoresis tests to uniformly and accurately deliver small quantities of liquid to the test paper.

Other objects and novel features of the present invention will become fully apparent from the appended claims and the ensuing detailed description and discussion taken in conjunction with the accompanying drawings, in which:

FIGURE 1 is a side view of a dilution loop constructed in accordance with the principles of the present invention;

FIGURE 2 is a plan view of the dilution loop of FIGURE 1 and is taken substantially along line 2—2 of that figure;

FIGURE 3 is a sectional view taken substantially along line 3—3 of FIGURE 2 and illustrates the manner in which the dilution loop handle is formed to prevent the liquid carried by the loop from being retained in the recesses in which the head forming wires of the loop are inserted;

Figure 4:
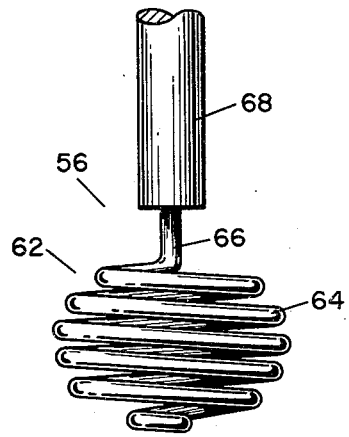
FIGURES 4–6 are side views of further dilution loops having liquid-carrying heads formed from spiral wound wire in acordance with the principles of the present invention.

Referring now to the drawings, FIGURE 1 illustrates a novel dilution loop 30 constructed in accordance with the principles of the present invention and having a liquid-carrying head 32 in the form of a hollow spherical tendril affixed to one end of an elongated handle 34, only a portion of which is shown. Liquid-carrying head 32 is formed from a pair of wires 36 and 38 of stainless steel or similar corrosion resistant material, each spirally wound into a substantially hemispherical configuration and provided with shanks 40 and 42, respectively.

The shanks 40 and 42 of wires 36 and 38 are inserted in side-by-side relationship into a longitudinally extending aperture 43 formed in the elongated loop handle 34 and opening onto its end surface 44. The hemispherical portions of wires 36 and 38 are disposed in mirror image relationship, providing the loop head 32 with a hollow, liquid-carrying interior and a spherical external configuration.

After the shanks 40 and 42 of the head forming wires 36 and 38 are inserted in handle aperture 43, the lower end portion of the handle is staked, providing substantially semicircular, longitudinally extending depressions 46 on the side surfaces 48 of the handle. The staking operation secures wires 36 and 38 in the handle and seals aperture 43 between their shanks 40 and 42, preventing liquid carried by the loop from being retained in the aperture.

Following the staking operation, the spirally wound wires 36 and 38 forming head 32 of loop 30 are compressed in a forming die to the configuration shown in FIGURE 1. More specifically, the hemispherical portions of spirally wound wires 36 and 38 are compressed to the shape of spherical segments, providing flat polar portions 50 and 52, respectively. The forming operation provides very accurate spacing between adjacent turns 54 of the spirally wound wires 36 and 38, significantly decreasing the deviations from desired capacity of the liquid-carrying head 32.

The liquid-carrying head 32, as was discussed above, is preferably fabricated from a corrosion resistant material such as stainless steel. Handle 34, which may also come in contact with the corrosive liquids carried by head 32, may be formed from a similar material, if desired. The particular material selected for the handle, however, is not critical and any corrosion resistant material which is deformable to seal aperture 43 around shanks 40 and 42 may be employed.

The non-spherical configuration of the liquid-carrying head 32 provides efficient agitating action when the loop is rotated within the recesses in the plates of the microtitration apparatus since this configuration causes the head 32 to exert a paddle wheel effect. In addition, the decreased diameter between polar flats 50 and 52 eliminates the possibility of the interior surfaces of the recesses being scratched by the ends of the wires 36 and 38 as the loop is rotated.

Figure 5:
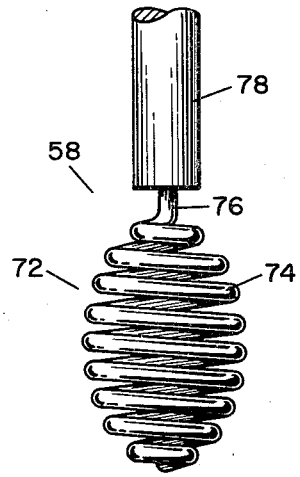
Figure 6:
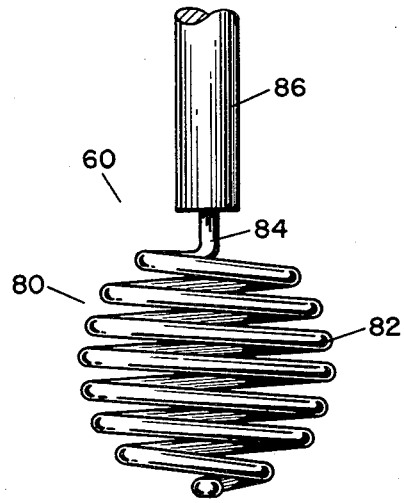

The dilution loops 56, 58 and 60 illustrated in FIGURES 4, 5, and 6, respectively, are similar to the dilution loop 30 described above except that their liquid-carrying heads are each formed from a single spirally wound wire providing a tendril having a hollow, liquid-receiving interior. Thus, the liquid-carrying head 62 of dilution loop 56 (see FIGURE 4) consists of a single wire 64 of corrosion resistant material, spirally wound to form a hollow tendril which, as in the embodiment of FIGURES 1–3, has an external configuration of two hollow spherical segments disposed in mirror image relationship and a hollow liquid-receiving interior. A shank 66, formed on one end of spirally wound wire 64, may be inserted into a longitudinally extending recess in the dilution loop handle 68 (not shown) which may then be compressed around shank 66 to retain it in the handle and to seal the open end of the aperture.

The liquid-carrying head 72 of dilution loop 58, like the head 62 of dilution loop 56, is formed from a single corrosion resistant wire 74 spirally wound into an enclosure-defining tendril which, in this embodiment, has a substantially ellipsoidal external configuration. A shank 76, formed on one end of wire 74, is adapted to be inserted in a longitudinally extending aperture (not illustrated) in the elongated handle 78 of the dilution loop. The lower end of handle 78 may then be compressed to seal the aperture and secure head 72 in place.

The liquid-carrying head 80 of dilution loop 60 (see FIGURE 6) is wound from a single wire 82 of corrosion resistant material in much the same manner as the liquid-carrying heads 62 and 72 of the dilution loops 56 and 58 illustrated in FIGURES 4 and 5. Wire 82, however, is wound into a substantially cylindrical or barrel-like configuration. As in the embodiments discussed above, the spirally wound wire 82 is provided with a shank 84 adapted to be inserted into an aperture (not illustrated) in the end of the dilution loop handle 86 which, as discussed above, may be compressed around the shank to secure it in place and seal the aperture.

The liquid-carrying heads 62, 72, and 80 of the dilution loops illustrated in FIGURES 4–6 are more accurate and provide more efficient agitating action than the spherical heads of the prior art dilution loops. The reasons for the improved accuracy and more efficient agitating action were discussed above in conjunction with the embodiment of FIGURES 1–3. In addition, since the spiral of the wire is coaxial with the head rotation axis during mixing, rotation of the head back and forth creates a vertical pumping action of the wire on the liquid in the recess, first up and then down. This produces a rapid mixture of the diluent and the reagent.

Figure 7:
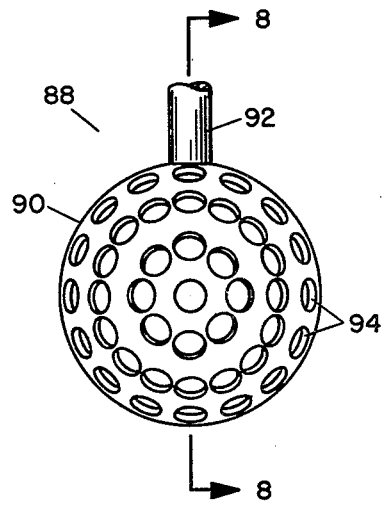
FIGURE 7 is an elevational view of a dilution loop wherein the liquid-carrying head is formed as a perforated spherical shell in accordance with the principles of the present invention.
Figure 8:
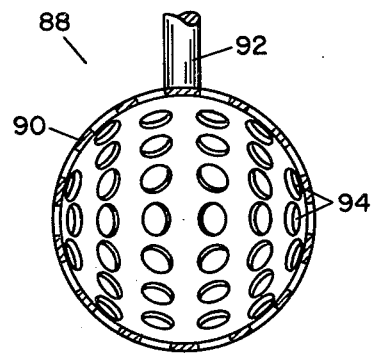
FIGURE 8 is a sectional view of the dilution loop of FIGURE 7 and is taken substantially along line 8—8 of that figure.

Greater accuracy and more efficient agitating action than was heretofore possible may also be obtained by forming the liquid-carrying head of the dilution loop from a hollow, apertured sphere or cylinder. Referring now to FIGURES 7 and 8, dilution loop 88 consists of a hollow, substantially spherical head 90 fixed to one end of an elongated handle 92. A plurality of circular perforations 94 formed in the head 90 permit the flow of the liquid material into and out of its hollow interior.

It is one of the advantages of liquid-carrying head 90 that it may be accurately sized to provide the desired liquid-carrying capacity with a tolerance much smaller than the prior art loops. In addition to being more accurate, the novel dilution loop 88 illustrated in FIGURES 7 and 8 has another important advantage. As was mentioned above, dilution loops of the type with which the present invention is concerned are often employed to handle highly corrosive liquids and consequently must be fabricated from materials such as stainless steel. The novel head construction illustrated in FIGURES 7 and 8 permits the liquid-carrying head to be fabricated from less expensive and more easily worked materials including corrosion resistant plastics. Head 90 may conveniently be formed by stamping two hemispherical members which may subsequently be joined by conventional plastic bonding techniques. Similar techniques may also be employed to fabricate head 90 from suitable metals or alloys.

Figure 9:
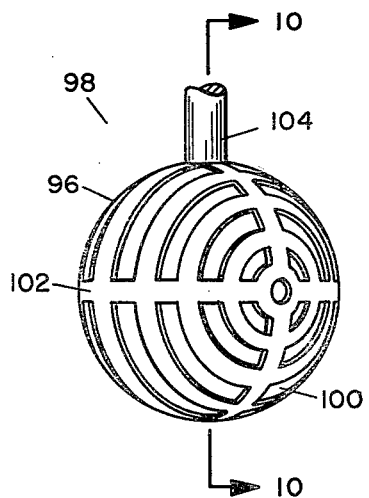
FIGURE 9 is a view similar to FIGURE 7 of a further dilution loop having a liquid-carrying head formed as a slotted spherical shell.
Figure 10:
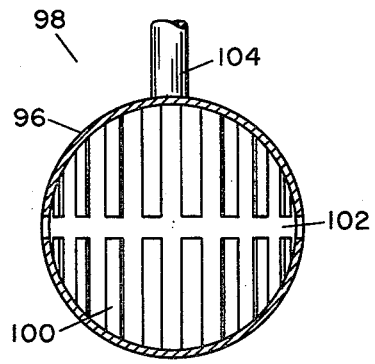
FIGURE 10 is a sectional view of the dilution loop of FIGURE 9 and is taken substantially along line 10—10 of that figure.

Referring now to FIGURES 9 and 10, the substantially spherical liquid-carrying head 96 of dilution loop 98 is similar to the dilution loop head 90 described above but is provided with an alternative arrangement of fluid communicating passages which permit the flow of liquid material into the interior of the head 96. In this embodiment, a plurality of parallel, spaced, arcuate slots 100 are formed along parallel minor circles of head 96. Preferably, each of these slots 100 is slightly less than 90° in length, providing transversely extending ribs 102 to maintain the spherical configuration of the head. The illustrated spacing and length of the ribs is not critical and may be varied as desired. The slotted head 96 of dilution loop 98, like the head 90 of dilution loop 88, may be fabricated from corrosion resistant metals, alloys or plastics. The head may be attached in any convenient manner to an elongated handle 104. Handle 104 may be of any suitable construction and may be fabricated from any desired corrosion resistant material.

Heads 90 and 96 are preferably formed with flattened polar regions in a plane normal to the axis of the associated handle to induce liquid agitation as the head is rotated therein.

The liquid-carrying head 106 of dilution loop 108 (see FIGURES 11–13) is a hollow member having a substantially cylindrical configuration. Head 106 may advantageously be fabricated from two independent cylindrical members 109 and 110 which may be stamped from a corrosion resistant metal, alloy, or plastic. A plurality of circular perforations 112 are formed in the cylindrical side wall 114 and in the end walls 116 and 118 of head 106, permitting liquid to flow into and out of its hollow interior. Head 106 may be secured in any appropriate manner to an elongated handle 120.

The cylindrical, non-spherical configuration of head 106, like the non-spherical heads of the agitating loops illustrated in FIGURES 1–6, provides a more efficient agitating action than the loops heretofore employed in addition to eliminating the possibility of scratching the interior surfaces of the recesses in the plates of the microtitration apparatus when the loop heads are rotated.

Figure 11:
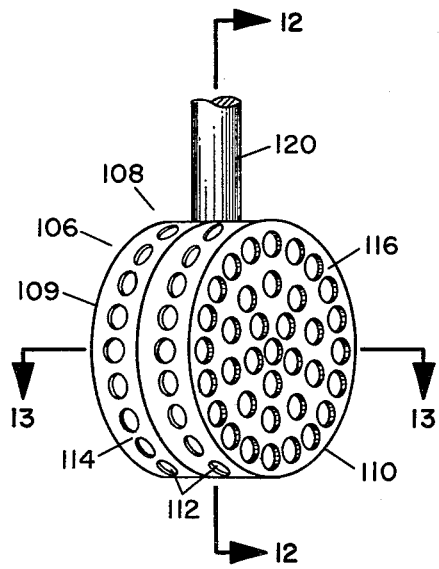
FIGURE 11 is a perspective view of a further dilution loop constructed in accordance with the principles of the present invention and having a hollow, perforated, cylindrical liquid-carrying head.
Figure 12:
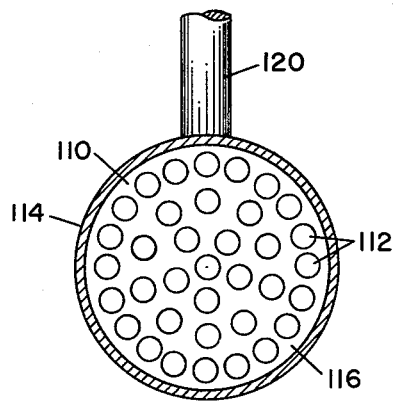
FIGURE 12 is a sectional view of the dilution loop of FIGURE 11 and is taken substantially along line 12—12 of that figure.
Figure 13:
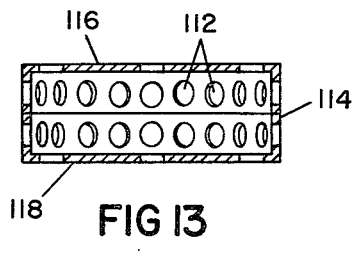
FIGURE 13 is a sectional view of the dilution loop of FIGURE 11 and is taken substantially along line 13—13 of that figure.
Figure 14:
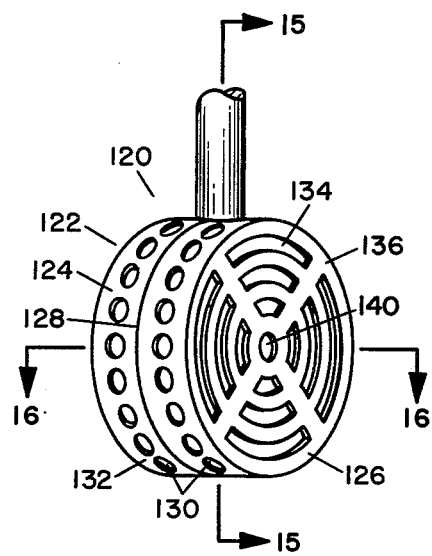
FIGURE 14 is a perspective view of a dilution loop constructed in accordance with the principles of the present invention and having a hollow cylindrical head with perforated cylindrical side walls and slotted circular end walls.
Figure 15:
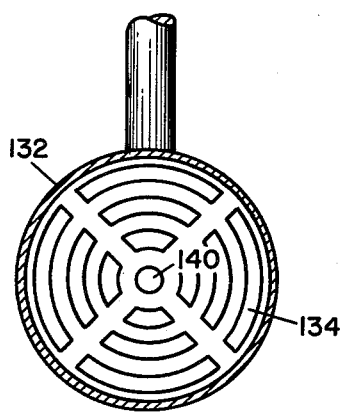
FIGURE 15 is a sectional view of the dilution loop of FIGURE 14 and is taken substantially along line 15—15 of that figure.
Figure 16:
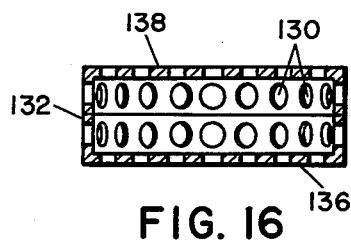
FIGURE 16 is a sectional view of the dilution loop of FIGURE 14 and is taken substantially along line 16—16 of that figure.

FIGURES 14–16 illustrate a dilution loop 120 having a liquid-carrying head 122 which, like head 106 of the dilution loop illustrated in FIGURES 11–13, is a hollow, substantially cylindrical member. In this instance, however, the head is provided with an alternative arrangement of apertures. Liquid-carrying head 122 may, as in the embodiment of FIGURES 11–13, be conveniently constructed by stamping a pair of independent members 124 and 126 from a corrosion resistant plastic, alloy, or metal and subsequently joining them in any suitable manner along parting line 128. A plurality of circular perforations 130, which may conveniently be formed during the stamping process, are formed in the cylindrical side wall 132 of the hollow head 122 thus formed. In addition, a plurality of concentric arcuate slots 134 are formed in the circular end walls 136 and 138 of the hollow head. Further, a circular aperture 140 may be formed at the midpoint of each of the circular side walls 136 and 138, if desired.

Figures 17, 18:
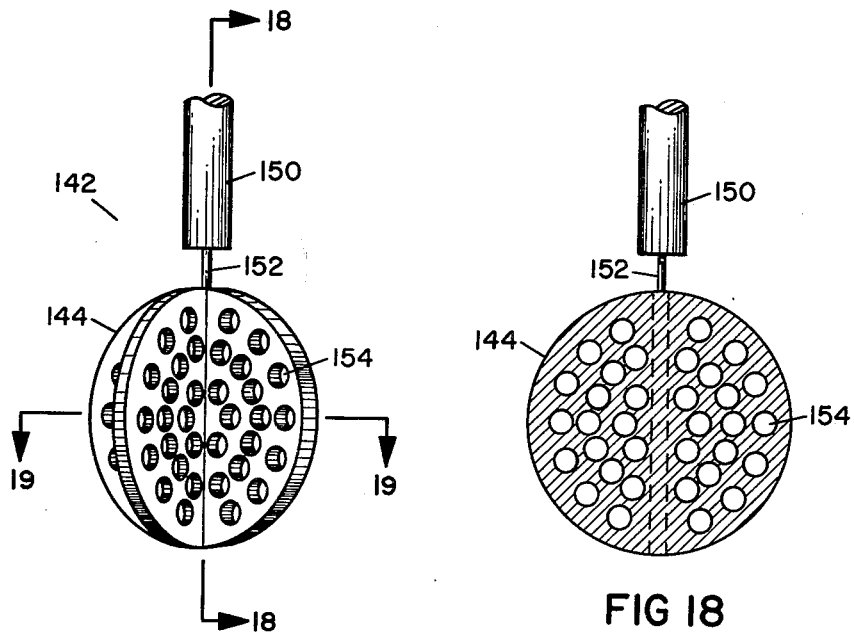
FIGURE 17 is a perspective view of a dilution loop constructed in accordance with the principles of the present invention and having a liquid-carrying head formed as mutually perpendicular perforated discs.
FIGURE 18 is a sectional view of the dilution loop of FIGURE 17 and is taken substantially along line 18—18 of that figure.
Figure 19:
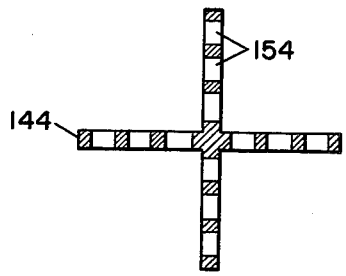
FIGURE 19 is a sectional view of the dilution loop of FIGURE 17 and taken substantially along line 19—19 of that figure.

FIGURES 17–19 illustrate a dilution loop 142 provided with a liquid-carrying head 144 having the configuration of a pair of mutually perpendicular circular discs and secured to the elongated loop handle 150 by a short shaft 152. Shaft 152 is soldered or otherwise attached, at one end, to head 144 and has its opposite end inserted in a longitudinally extending aperture (not shown) formed in the end of handle 150.

Head 144 may, like the dilution loops described above, be formed from a corrosion resistant metal, alloy, or plastic. The capacity of head 144 of loop 142 is determined by the number and size of perforations 154 in which the liquid retained by surface tension.

Instead of fabricating head 144 as a unitary member, it may be constructed from a circular disc with semicircular discs secured to its opposite sides. This head configuration provides a highly efficient agitating action when rotated in the recesses of the microtitration apparatus plates.

Figures 20, 21:
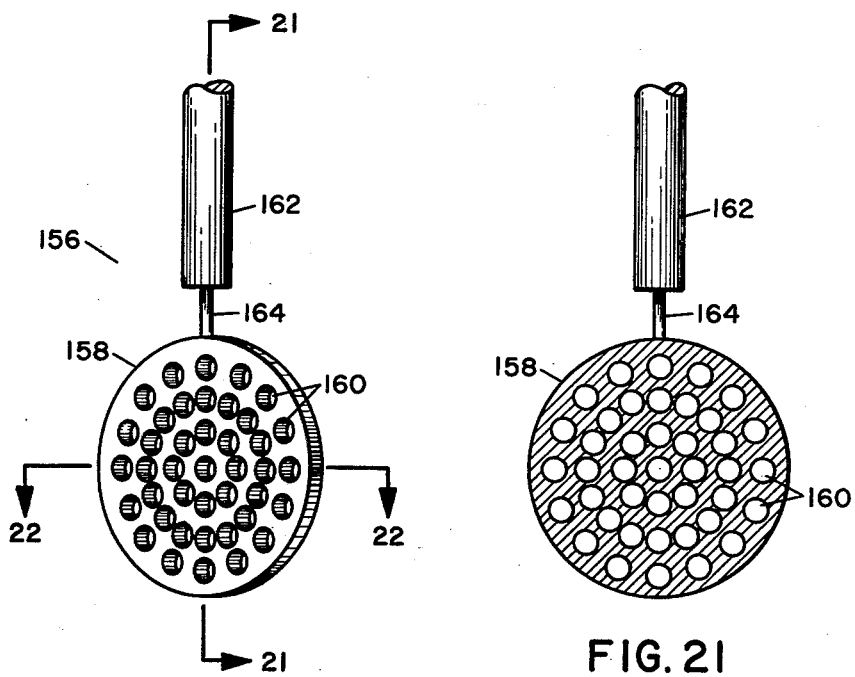
FIGURE 20 is a view similar to FIGURE 17 of a dilution loop constructed in accordance with the principles of the present invention and having a liquid-carrying head formed from a single perforated disc.
FIGURE 21 is a sectional view of the dilution loop of FIGURE 20, taken substantially along line 21—21 of that figure.
Figure 22:
FIGURE 22 is a sectional view of the dilution loop of FIGURE 20 taken substantially along line 22—22 of that figure.

The dilution loop 156 illustrated in FIGURES 20–22 is similar to the dilution loop 142 illustrated in FIGURES 17–19 and described above except that its liquid-carrying head 158 is a single, circular, perforated disc of corrosion resistant metal, alloy, or plastic. As in the embodiment of FIGURES 17–19, perforations 160 retain liquid by surface tension and may be varied in size and number to provide the desired capacity.

As in the embodiment of FIGURES 17–19, the liquid-carrying head 158 of dilution loop 156 may be connected to an elongated dilution loop handle 162 by a short cylindrical shaft 164 connected at its lower end in any suitable manner to the liquid-carrying head 158 and having its upper end inserted into a longitudinally extending aperture (not shown) in the lower end of the handle.

A sufficient number of perforations 160 may be provided in the liquid-carrying disc like head 158 to provide a capacity of 0.025 to 0.050 milliliter, the usual capacity of dilution loops. Because of the comparatively large number and the small diameter of the perforations, the capacity of liquid-carrying head 158, as well as the head 144, described above, can be accurately controlled. Head 158 is extremely simple and inexpensively manufactured and, because of its non-circular configuration, it provides an effective agitating action when rotated in the recesses in the plates of microtitration apparatus of the type described above.

The dilution loops described above may have an over-all length of approximately seven inches. Typically, the liquid-carrying heads of these loops have an outside diameter of 0.125 inch and, as mentioned above, a capacity of either 0.025 or 0.050 milliliter. The stainless steel or other corrosion resistant wire from which the heads of the dilution loops illustrated in FIGURES 1 and 4–6 are wound may typically have a diameter of 0.014 inch.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A liquid retaining loop having a longitudinally apertured handle and a hollow head formed of a pair of spirally wound wires for carrying liquid having a surface tension, the apertures between adjacent turns of said spirally wound wires being of a size not greater than that which will retain said liquid in said loop by the said surface tension and the spirally wound wires constituting a hollow cage surrounding and defining a liquid-receiving enclosure, the ends of said wires being disposed in said aperture in spaced side-by-side relationship and said handle being staked between said wires to seal said aperture and secure said head to said handle.

2. A liquid retaining loop for carrying liquid having a surface tension, comprising: an elongated handle and a hollow spherical shell having a plurality of parallel arcuate slots formed therein along minor circles of said sphere fixed to one end of said handle, the size of said slots being not greater than that which will retain said liquid in said hollow spherical shell by the said surface tension.

3. A liquid retaining loop, comprising: an elongated handle and a hollow cylindrical head for carrying liquid having surface tension fixed to one end of said handle, said head having a perforate cylindrical side wall and circular end walls each having a plurality of concentric arcuate slots formed therein, the size of the perforations in the side wall and of the slots in said end walls being not greater than that which will retain said liquid in said head by the said surface tension.

4. A liquid retaining loop, comprising: an elongated handle and a head for carrying liquid having a surface tension comprising a pair of mutually perpendicular perforate discs fixed to one end of said handle, the size of the perforations in said discs being not greater than that which will retain said liquid in said head by the said surface tension.

5. A volumetric liquid-transfer device, comprising a liquid-entrapping cage for carrying liquid having a surface tension having the configuration of a surface of revolution with an axis intersecting said surface at an apical region thereof, the center of gravity of said cage lying substantially along said axis, said cage having an outer surface diverging upwardly and outwardly from said apical region and being provided with a plurality of through going capillary channels having portions extending generally in directions transverse to said axis and communicating with the interior of said cage, and a stem secured to said cage at a location along said axis, said liquid-entrapping cage comprising a wire loop wound in spiral turns along said axis of progressively increasing radius and progressively increasing distance from said apical region for a predetermined distance along said axis, the size of the through going capillary channels between the adjacent turns of said wire loop being of a size not greater than that which will retain said liquid in said loop by the said surface tension.

6. The device of claim 5 wherein said wire loop is wound in spiral turns along said axis of progressively decreasing radius and progressively increasing distance from said apical region for the remainder of its length along said axis beyond said predetermined distance.

7. A volumetric liquid-transfer device, comprising a liquid-entrapping cage for carrying liquid having a surface tension having an exterior configuration including a surface of revolution about a first axis and substantially planar end surfaces symmetrical with a plane normal to said first axis, the center of gravity of said cage lying substantially at the intersection of said axis and said plane, the surface of revolution and the end surfaces of said cage being provided with a plurality of through going non-circular capillary channels communicating with the interior of said cage, the size of said capillary channels being not greater than that which will retain said liquid in said cage by the said surface tension.

8. The device as defined in claim 7, wherein said cage is a hollow cylinder.

9. The device as defined in claim 7, wherein said cage is formed from a single wound wire tendril.

10. A volumetric liquid transfer device, comprising a liquid entrapping cage for carrying liquid having a surface tension comprising two substantially symmetrical wire loops wound in spiral turns of progressively increasing distance from a common central plane along an axis of said cage transverse to said plane over a predetermined length along said axis and wound in spiral turns of progressively decreasing radius at a constant distance from said common central plane at the opposite ends of said cage, and a handle for said cage including two elongated shanks integrally extending along said plane from the adjacent turns of each of said loops, the turns of each of said loops being separated from one another by capillary channels giving access to the interior of said cage, the size of said capillary channels being not greater than that which will retain said liquid in said cage by the said surface tension.

11. The device defined in claim 10, wherein the spiral turns of said wire loops along said predetermined portion of said axis are of progressively decreasing radius whereby said liquid-entrapping cage is of generally spherical configuration having flat polar regions at its opposite ends along said axis.

12. A volumetric liquid-transfer device, comprising a liquid-entrapping cage for carrying liquid having a surface tension having the configuration of a surface of revolution with an axis intersecting said surface at an apical region thereof, the center of gravity of said cage lying substantially along said axis, said cage having an outer surface diverging upwardly and outwardly from said apical region and being provided with a plurality of through going non-circular capillary channels having portions extending generally in directions transverse to said axis and communicating with the interior of said cage, the size of said capillary channels being not greater than that which will retain said liquid in said cage by the said surface tension, and a stem secured to said cage at a location along said axis.

13. The device as defined in claim 7, wherein said cage is formed from a pair of wire tendrils.

14. A liquid carrying and transfer device comprising:
(a) an elongated handle;
(b) an apertured head adapted to receive and internally retain by capillary attraction an accurately predetermined volume of liquid comprised of a pair of wound wire tendrils, each formed substantially as a spherical segment, said tendrils being fixed to one end of said elongated handle in mirror image relationship to define a liquid-receiving enclosure, said head being free of sharp, scratch producing projections and having a plane of symmetry including the longitudinal axis of said handle and the size of the apertures in said head being not greater than that which will retain said liquid in said head by surface tension; and
(c) means symmetrical with said longitudinal axis connecting said head to said handle.

15. A liquid carrying and transfer device comprising:
(a) an elongated handle;
(b) an apertured head adapted to receive and internally retain by capillary attraction an accurately predetermined volume of liquid comprised of a hollow, ellipsoidal, wound wire tendril, said head being free of sharp, scratch producing projections and having a plane of symmetry including the longitudinal axis of said handle and the apertures in said head being non-circular and of a size not greater than that which will retain said liquid in said head by surface tension; and
(c) means symmetrical with said longitudinal axis connecting said head to said handle.

16. A liquid carrying and transfer device comprising:
(a) an elongated handle;
(b) an apertured head adapted to receive and internally retain by capillary attraction an accurately predetermined volume of liquid comprised of a hollow wound wire tendril, the shape of said tendril being substantially that of a sphere with the polar regions flattened, said head being free of sharp, scratch producing projections and having a plane of symmetry including the longitudinal axis of said handle and the size of the apertures in said head being not greater than that which will retain liquid in said head by surface tension; and
(c) means symmetrical with said longitudinal axis connecting said head to said handle.

17. A liquid carrying and transfer device comprising:
(a) an elongated handle;
(b) an apertured head adapted to receive and internally retain by capillary attraction an accurately predetermined volume of liquid comprised of a hollow wire tendril having a barrel-like configuration, said head being free of sharp, scratch producing projections and having a plane of symmetry including the longitudinal axis of said handle and the size of the apertures in said head being not greater than that which will retain liquid in said head by surface tension; and
(c) means symmetrical with said longitudinal axis connecting said head to said handle.

18. A liquid carrying and transfer device comprising:
(a) an elongated handle;
(b) an apertured head adapted to receive and internally retain by capillary attraction an accurately predetermined volume of liquid comprised of a hollow spherical shell having a plurality of arcuate slots formed therein along parallel minor circles of said sphere, said head being free of sharp, scratch producing projections and having a plane of symmetry including the longitudinal axis of said handle and the size of the apertures in said head being not greater than that which will retain liquid in said head by surface tension; and
(c) means symmetrical with said longitudinal axis connecting said head to said handle.

19. A liquid carrying and transfer device comprising:
(a) an elongated handle;
(b) an apertured head adapted to receive and internally retain by capillary attraction an accurately predetermined volume of liquid comprised of a hollow cylindrical shell, said shell having a perforate cylindrical side wall and circular end walls each having a plurality of concentric arcuate slots formed therein, said head being free of sharp, scratch producing projections and having a plane of symmetry including the longitudinal axis of said handle and the size of the apertures in said head being not greater than that which will retain liquid in said head by surface tension; and
(c) means symmetrical with said longitudinal axis connecting said head to said handle.

20. A liquid carrying and transfer device comprising:
(a) an elongated handle;
(b) an apertured head adapted to receive and internally retain by capillary attraction an accurately predetermined volume of liquid comprising a pair of mutually perpendicular perforate discs, said head being free of sharp, scratch producing projections and having a plane of symmetry including the longitudinal axis of said handle and the size of the apertures in said head being not greater than that which will retain liquid in said head by surface tension; and
(c) means symmetrical with said longitudinal axis connecting said head to said handle.

21. A volumetric liquid-transfer device, comprising a liquid-entrapping cage for carrying a liquid having a surface tension, said cage having an exterior configuration including an elongated cylindrical surface portion and end surfaces at opposite ends of said cylindrical surface portion which are symmetrical with the axis of symmetry of said cylindrical surface portion, the portions of said cage defined by said cylindrical surface portion and at least one of said end surfaces being provided with a plurality of through going channels communicating with the interior of said cage, the size of said capillary channels being not greater than that which will retain said liquid in said cage by surface tension.

References Cited by the Examiner

UNITED STATES PATENTS

| 441,343 | 11/90 | Warner | 16—120 |
| 831,228 | 9/06 | Kampfe | 16—120 |
| 1,643,891 | 9/27 | Howell | 16—120 |
| 1,749,312 | 3/30 | Blair | 222—373 X |
| 1,749,752 | 3/30 | Bolinder | 16—120 |
| 2,514,009 | 7/50 | Raspet | 46—6 |
| 2,631,404 | 3/53 | Clausen | 46—7 |
| 2,858,639 | 11/58 | Lawrence | 46—7 |
| 3,002,314 | 10/61 | Brottman | 46—6 |

FOREIGN PATENTS

| 234,220 | 5/26 | Great Britain. |
| 156,213 | 9/56 | Sweden. |

LOUIS J. DEMBO, *Primary Examiner.*

HADD S. LANE, *Examiner.*